United States Patent
Nagatani

(10) Patent No.: US 10,654,436 B2
(45) Date of Patent: May 19, 2020

(54) SLIDING DEVICE

(71) Applicant: TOYOTA BOSHOKU KABUSHIKI KAISHA, Aichi (JP)

(72) Inventor: Yuki Nagatani, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 43 days.

(21) Appl. No.: 15/957,123

(22) Filed: Apr. 19, 2018

(65) Prior Publication Data
US 2018/0334056 A1 Nov. 22, 2018

(30) Foreign Application Priority Data

May 18, 2017 (JP) ................................. 2017-098964

(51) Int. Cl.
  *B60R 21/015* (2006.01)
  *B60N 2/02* (2006.01)

(52) U.S. Cl.
  CPC ... *B60R 21/01554* (2014.10); *B60N 2002/0272* (2013.01)

(58) Field of Classification Search
  CPC .... B60N 2002/0272; B60N 2002/0268; B60R 21/04554; B60R 21/01554
  USPC ........... 324/207.2, 207.24, 207.26; 280/735; 248/424, 429, 430; 73/866.5
  See application file for complete search history.

(56) References Cited

U.S. PATENT DOCUMENTS

| | | | |
|---|---|---|---|
| 6,774,625 B2 * | 8/2004 | Suzuki | B60N 2/0224 324/207.2 |
| 6,798,196 B2 * | 9/2004 | Kojima | B60N 2/0224 324/207.26 |
| 6,851,655 B2 * | 2/2005 | Kume | B60N 2/0224 248/424 |
| 6,921,107 B2 * | 7/2005 | Mills | B60N 2/0224 280/735 |
| 6,935,692 B2 * | 8/2005 | Nishide | B60N 2/002 248/429 |
| 7,330,008 B2 * | 2/2008 | Lee | B60N 2/06 318/466 |
| 7,564,234 B2 | 7/2009 | Endoh et al. | |
| 8,806,936 B2 * | 8/2014 | Suzuki | G01D 5/145 324/207.24 |

(Continued)

FOREIGN PATENT DOCUMENTS

JP 2004-203150 A 7/2004

*Primary Examiner* — Jonathan Liu
*Assistant Examiner* — Guang H Guan
(74) *Attorney, Agent, or Firm* — Greenblum & Bernstein, P.L.C.

(57) ABSTRACT

One example of a sliding device for a vehicle seat that can reduce false detection by a sensor is disclosed. The sliding device includes a fixed rail fixed to a vehicle; a movable rail, to which the vehicle seat is directly or indirectly fixed, that is slidable relative to the fixed rail; a mounting bracket having a fixed portion directly or indirectly fixed to the movable rail, and an extending portion extending from the fixed portion to a front side of the seat; a sensor fixed to the mounting bracket and displaced with the movable rail to detect a position of the movable rail; and a restrictor located closer to the front side of the seat than the fixed portion is. The restrictor restricts a displacement of the sensor by contacting the mounting bracket or the sensor when the extending portion is displaced in excess of a predefined extent.

7 Claims, 4 Drawing Sheets

(56) References Cited

U.S. PATENT DOCUMENTS

| | | | | |
|---|---|---|---|---|
| 8,985,542 | B2* | 3/2015 | Diemer | B60N 2/07 |
| | | | | 248/429 |
| 9,272,638 | B2* | 3/2016 | Saini | B60N 2/0705 |
| 10,384,630 | B2* | 8/2019 | Tsukamoto | B60N 2/0705 |
| 2005/0057065 | A1 | 3/2005 | Endoh et al. | |
| 2016/0061860 | A1* | 3/2016 | Kitou | B60N 2/07 |
| | | | | 73/431 |
| 2017/0067761 | A1* | 3/2017 | Kito | G01D 11/30 |
| 2018/0334056 | A1* | 11/2018 | Nagatani | B60N 2/0244 |

* cited by examiner

SLIDING DEVICE

CROSS-REFERENCE TO RELATED APPLICATIONS

This application claims the benefit of Japanese Patent Application No. 2017-098964 filed May 18, 2017 in the Japan Patent Office, the entire disclosure of which is incorporated herein by reference.

BACKGROUND

The present disclosure relates to a sliding device for slidably supporting a vehicle seat.

For example, Japanese Unexamined Patent Application Publication 2004-203150 discloses a sliding device that comprises a sensor for detecting a position of a vehicle seat. This sensor is assembled to a movable rail, such as an upper rail, via a mounting bracket.

SUMMARY

The sliding device is located in a lower area of the vehicle seat and slidably supports the vehicle seat. In other words, the aforementioned sensor is located in the lower area of the vehicle seat. Due to such location of the sensor, a problem as mentioned below may occur in a vehicle that comprises another vehicle seat (hereinafter, referred to as rear seat) in a rear side of the vehicle seat (hereinafter, referred to as front seat).

The problem is that, when the rear seat is situated close to the front seat, a toe of an occupant who is seated in the rear seat may touch the sensor of the front seat.

If such an incident significantly displaces the sensor from its regular position, the sensor may falsely detect the position of the vehicle seat. In the "regular position", the sensor is designed to accurately detect the position.

Preferably, one aspect of the present disclosure provides a sliding device for a vehicle seat that can reduce false detections.

The present disclosure is a sliding device for slidably supporting a vehicle seat. The sliding device comprises a fixed rail; a movable rail; a mounting bracket; a sensor; and a restrictor. The fixed rail is fixed to a vehicle. The movable rail is slidable relative to the fixed rail, and the vehicle seat is directly or indirectly fixed to the movable rail. The mounting bracket includes a fixed portion fixed directly or indirectly to the movable rail, and an extending portion extending from the fixed portion to a front side of the vehicle seat. The sensor is fixed to the mounting bracket and configured to be displaced together with the movable rail to detect a position of the movable rail. The restrictor is located closer to the front side of the vehicle seat than the fixed portion is, and restricts a displacement of the sensor by coming in contact with the mounting bracket or the sensor when the extending portion of the mounting bracket is displaced in excess of a predefined extent.

Accordingly, the sensor is located closer to the front side of the seat than the fixed portion of the mounting bracket. This reduces incidents in which a toe of an occupant who is seated in the rear seat touches the sensor.

If a toe of the occupant touches the sensor or the mounting bracket, the contact between the restrictor and the mounting bracket still reduces a large displacement of the sensor from its regular position.

Since the mounting bracket of the sliding device extends from the fixed portion to the front side of the seat, and not to the rear side of the seat, it is less likely that the mounting bracket is largely deformed away from the restrictor. Accordingly, a large displacement of the sensor from its regular position can be reduced.

An intermediate bracket for supporting the vehicle seat may be fixed to the movable rail. The mounting bracket may be fixed to the intermediate bracket. The intermediate bracket may include the restrictor.

This eliminates a need to arrange a dedicated member to serve as the restrictor. In other words, the already located bracket can be used to serve as the restrictor.

BRIEF DESCRIPTION OF THE DRAWINGS

An embodiment of the present disclosure will be described hereinafter by way of example with reference to the accompanying drawings, in which.

DETAILED DESCRIPTION OF THE PREFERRED EMBODIMENTS

Figure 1:
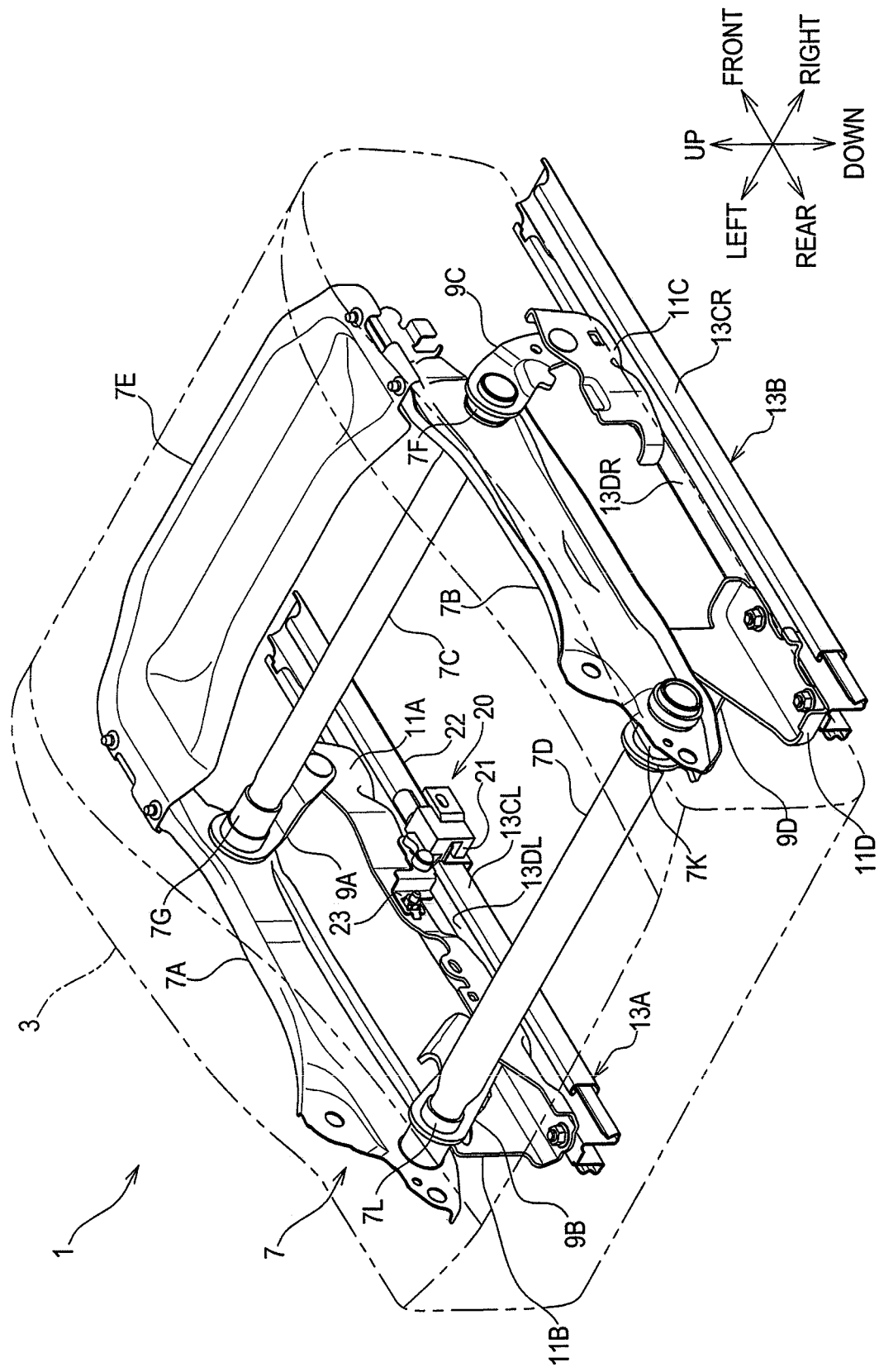
FIG. 1 is a diagram showing a cushion frame of a vehicle seat according to an embodiment.

An "embodiment" explained hereinafter shows one example of embodiments that belong to the technical scope of the present disclosure. In other words, matters to specify the invention recited in the claims are not limited to specific configurations or structures that are shown in the embodiments explained hereinafter.

Arrows and other marks that indicate directions on each drawings are made for easy understanding of relationship between each drawing. Arrows and other marks (directions) labelled on each drawing do not limit the scope of the present disclosure.

At least in respect of a member or portion that is labeled with a reference numeral for explanations, there is at least one in number of such a member or portion unless the number is otherwise specified.

FIRST EMBODIMENT

1. Outline of Vehicle Seat

As shown in FIG. 1, a vehicle seat 1 comprises at least a seat cushion 3, and a cushion frame 7. The seat cushion 3 supports the buttocks of an occupant.

The cushion frame 7 is a frame of the seat cushion 3. The cushion frame 7 comprises at least a first side frame 7A, and a second side frame 7B. In the present embodiment, the first side frame 7A is located in the left side of the seat and extends in a front-rear direction.

The second side frame 7B is located apart from the first side frame 7A across the width of the seat (in the right side of the seat in the present embodiment) and extends in the front-rear direction. The first side frame 7A and the second side frame 7B are coupled to each other via a first connecting rod 7C and a second connecting rod 7D.

The first connecting rod 7C extends along the width of the seat and couples a front end of the first side frame 7A to a front end of the second side frame 7B via collars 7F and 7G (front right collar 7F and front left collar 7G). The second connecting rod 7D extends along the width of the seat and couples a rear end of the first side frame 7A to a rear end of the second side frame 7B via collars 7K and 7L (rear right collar 7K and rear left collar 7L).

A front panel 7E supports a front end of the seat cushion 3. The front panel 7E extends like a bridge from the front end of the first side frame 7A to the front end of the second side frame 7B and is fixed to the first side frame 7A and the second side frame 7B.

The cushion frame 7 is supported by and fixed to the vehicle body via lifter links 9A to 9D (front left lifter link 9A, rear left lifter link 9B, front right lifter link 9C, rear right lifter link 9D) and intermediate brackets 11A to 11D (front left intermediate bracket 11A, rear left intermediate bracket 11B, front right intermediate bracket 11C, rear right intermediate bracket 11D). In other words, the intermediate brackets 11A to 11D are coupled to the vehicle body, such as a floor panel, and designed to couple the cushion frame 7 to the vehicle body.

The intermediate brackets 11A and 11B, and 11C and 11D according to the present embodiment are fixed to the vehicle body respectively via seat sliding devices 13A and 13B (left seat sliding device 13A and right seat sliding device 13B). The seat sliding devices 13A and 13B are designed to support and fix the vehicle seat 1 to the vehicle body such that the vehicle seat 1 is displaceable relative to the vehicle body.

The seat sliding devices 13A and 13B respectively comprise fixed rails 13CL and 13CR (left fixed rail 13CL and right fixed rail 13CR) that are fixed to the vehicle body, and movable rails 13DL and 13DR (left movable rail 13DL and right movable rail 13DR, also known as "sliding rails") that are respectively slidable relative to the fixed rails 13CL and 13CR. The intermediate bracket 11A and 11B are fixed to the movable rail 13DL of the seat sliding device 13A that is arranged to correspond to the first side frame 7A.

The intermediate brackets 11C and 11D are fixed to the movable rail 13DR of the seat sliding device 13B that is arranged to correspond to the second side frame 7B. The intermediate bracket 11A and the intermediate bracket 11B according to the present embodiment are preferably integrally made from metal.

An upper end of each of the lifter links 9A to 9D is pivotably coupled to the cushion frame 7. Lower ends of the lifter links 9A to 9D are pivotably coupled to their corresponding intermediate brackets, 11A to 11D, respectively.

More specifically, the upper ends of the lifter links 9A and 9C are fixed to the first connecting rod 7C, respectively via the collars 7G and 7F, by a fixing method such as welding. The first connecting rod 7C is rotatably coupled to the first side frame 7A and the second side frame 7B respectively via the collars 7G and 7F.

The lower ends of the lifter links 9A and 9C are pivotably assembled to the intermediate brackets 11A and 11C respectively. The upper ends of the lifter links 9B and 9D are fixed to the second connecting rod 7D, respectively via the collars 7L and 7K, by a method such as welding.

The second connecting rod 7D is rotatably coupled to the first side frame 7A and the second side frame 7B respectively via the collars 7L and 7K. The lower ends of the lifter links 9B and 9D are pivotably assembled to the intermediate brackets 11B and 11D respectively.

In other words, the vehicle seat 1 (the cushion frame 7) is indirectly fixed to the movable rails 13DL and 13DR via the corresponding lifter links 9A to 9D and the intermediate brackets 11A to 11D. Each of the lifter links 9A to 9D is pivotally driven by manual operation or by an actuator such as an electric motor.

2. Seat-Position Detecting Mechanism

Figure 2:
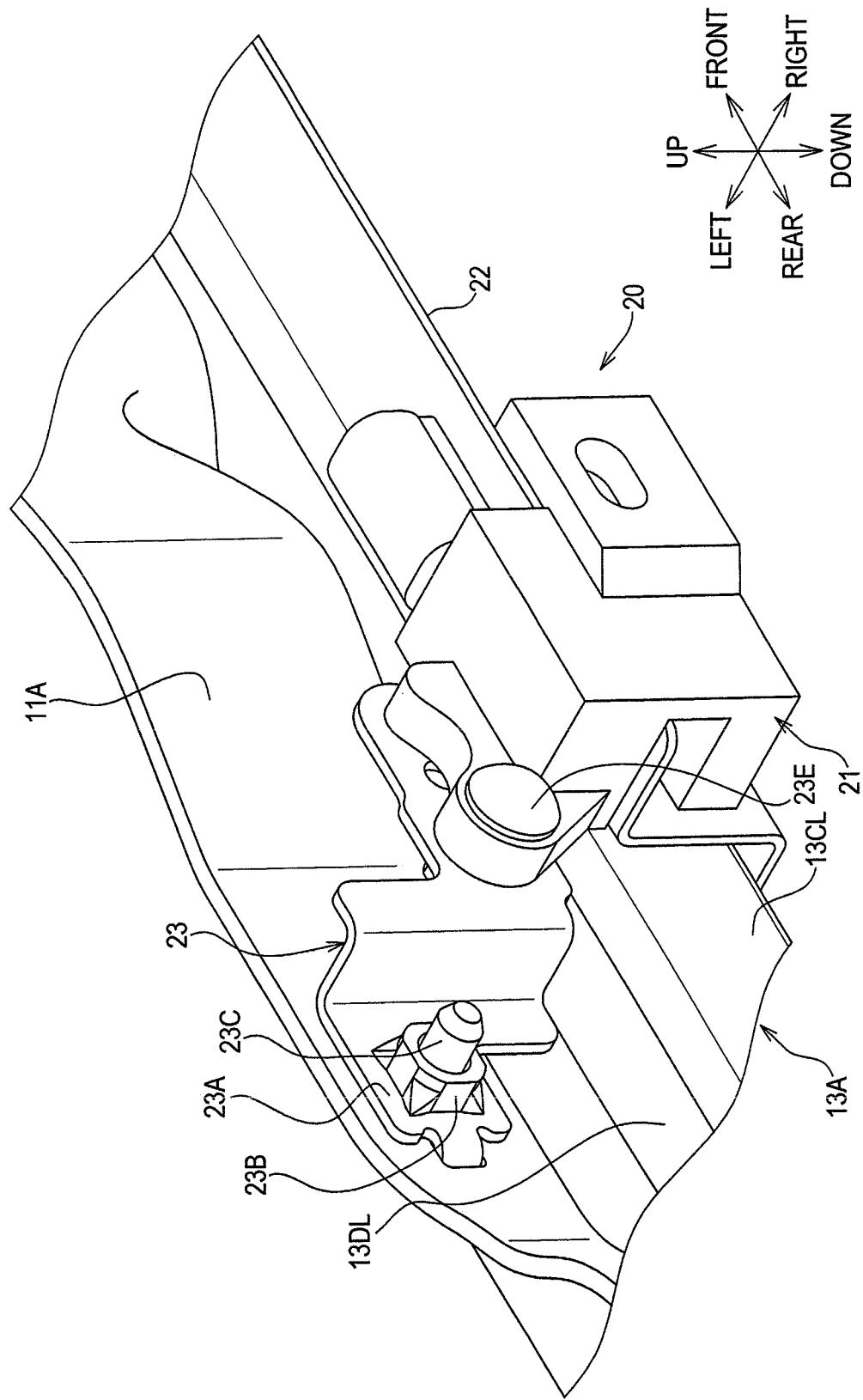
FIG. 2 is a diagram showing a seat-position detecting mechanism according to the embodiment.

A seat-position detecting mechanism 20 shown in FIG. 2 is for detecting a position of the vehicle seat 1 along the front-rear axis. The seat-position detecting mechanism 20 comprises a sensor 21 and a sensor plate 22.

The sensor 21 is displaced together with the movable rail 13DL and cooperates with the sensor plate 22 to detect the position of the movable rail 13DL. In other words, the seat-position detecting mechanism 20 indirectly detects the position of the vehicle seat 1 by detecting the position of the movable rail 13DL.

The sensor 21 according to the present embodiment detects a change in a magnetic field of, for example, a proximity switch and outputs a signal. The sensor plate 22 is a metallic plate member and is fixed to the fixed rail 13CL. Thus, the strength of the magnetic field detected by the sensor 21 changes depending on the presence of the sensor plate 22.

In other words, the strength of the magnetic field detected by the sensor 21 changes between when the sensor 21 is situated in an area where the sensor plate 22 is located (see, FIG. 2) and when the sensor 21 is situated in an area where the sensor plate 22 is not located. This allows the seat-position detecting mechanism 20 to detect which of the areas the vehicle seat 1 is situated.

Figure 3:
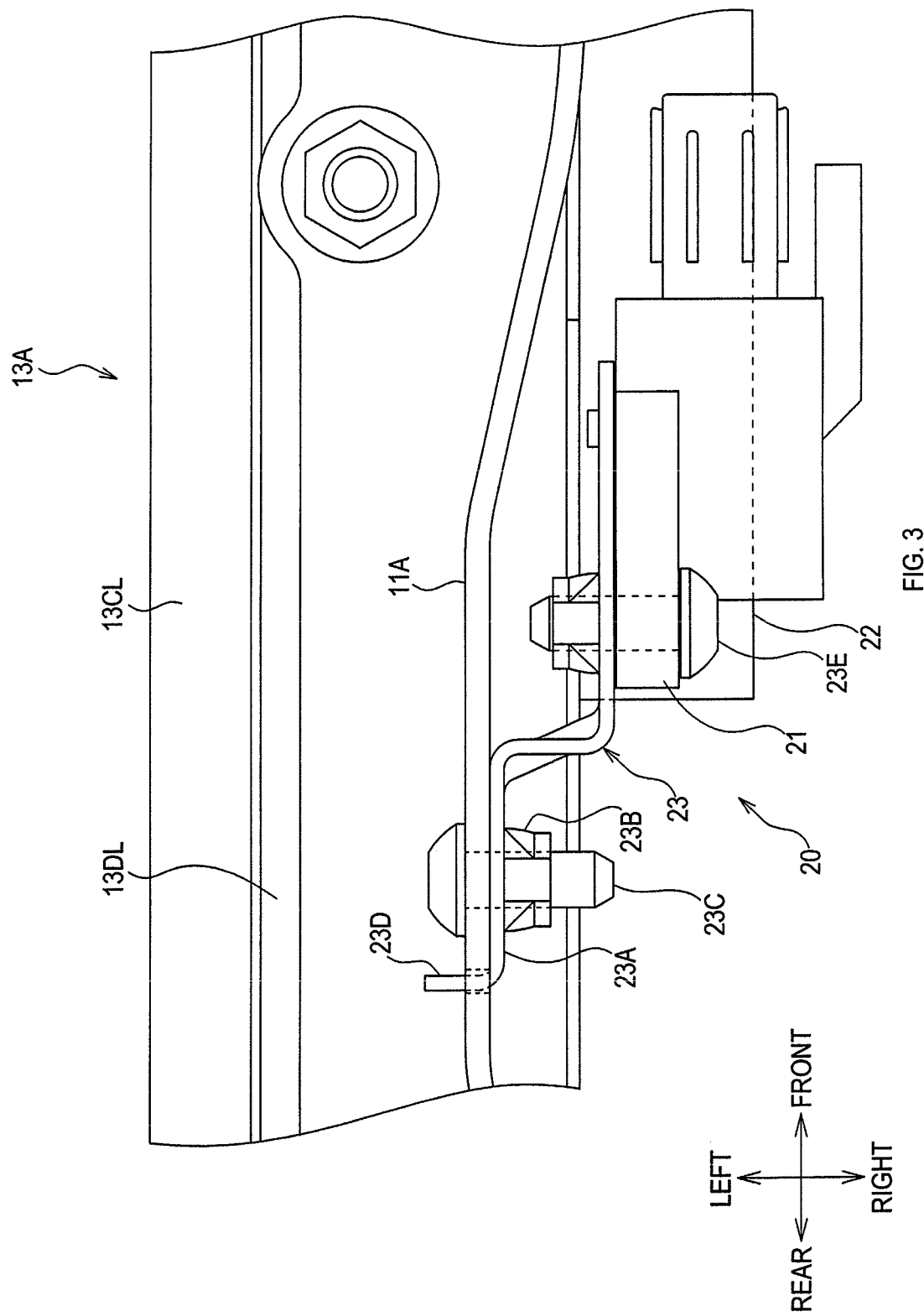
FIG. 3 is a diagram showing the seat-position detecting mechanism according to the embodiment.

As shown in FIG. 3, the sensor 21 is fixed to the intermediate bracket 11A via a mounting bracket 23. In other words, the sensor 21 is fixed to the movable rail 13DL via the mounting bracket 23 and the intermediate bracket 11A.

Figure 4:
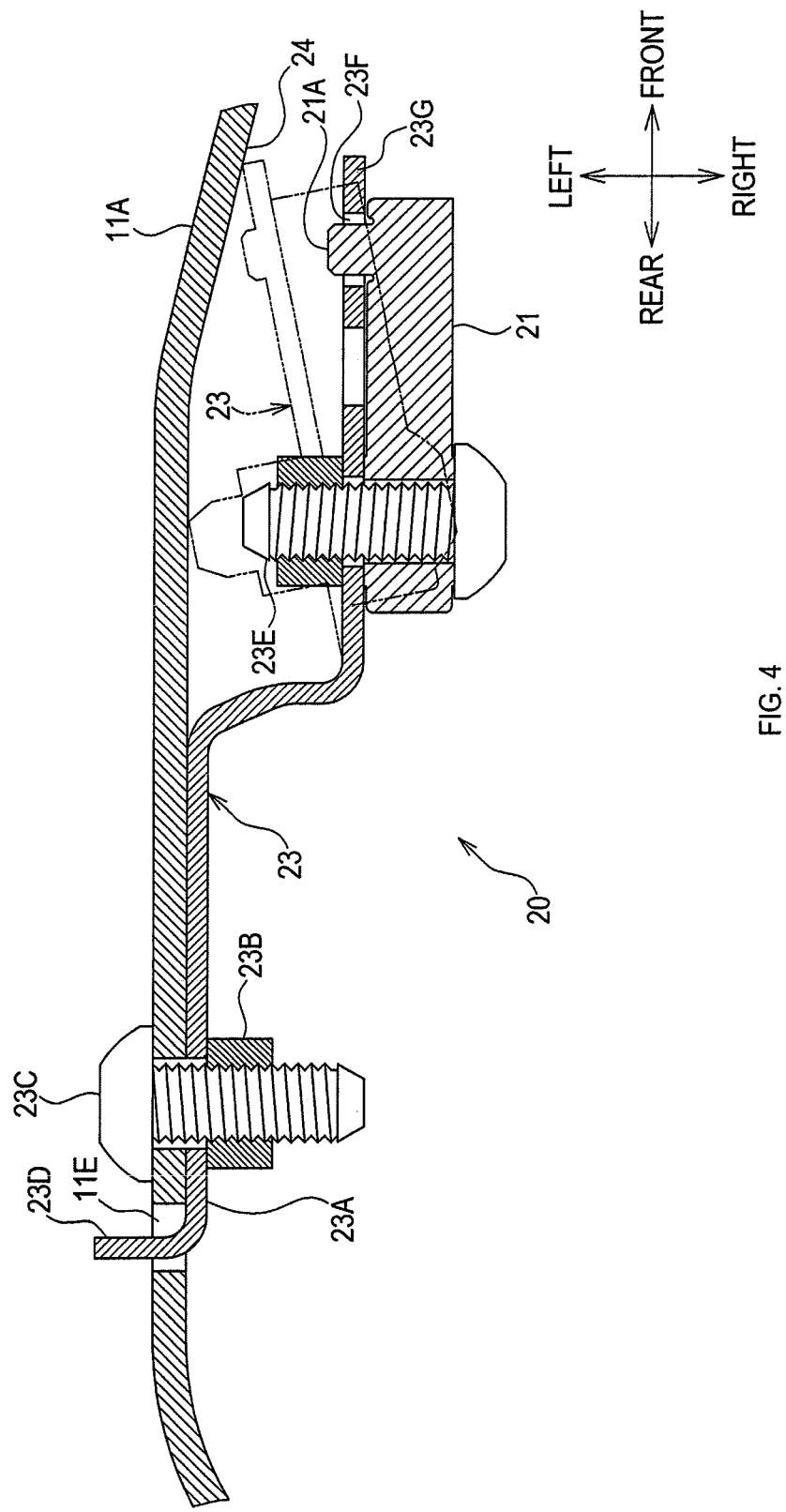
FIG. 4 is a diagram showing a mounting bracket according to the embodiment.

As shown in FIG. 4, the mounting bracket 23 extends from a fixed portion 23A of the mounting bracket 23 to the front side of the seat. The fixed portion 23A is a part of the mounting bracket 23 and is fixed to the intermediate bracket 11A, and thus indirectly fixed to the movable rail 13DL.

In other words, the mounting bracket 23 has a "cantilever structure", by which the mounting bracket 23 is fixed to the movable rail 13DL at a first end of the mounting bracket 23 (the fixed portion 23A) and has an extending portion 23G (also known as a second end, or a leading end, or a cantilever portion) of the mounting bracket 23 free from support.

A nut 23B (a weld nut in the present embodiment) is welded to the fixed portion 23A. As shown in FIG. 4, the fixed portion 23A is fixed to the intermediate bracket 11A with a bolt 23C, which is screwed to the nut 23B through the intermediate bracket 11A.

A projection 23D is a rotation stopper for the mounting bracket 23. More specifically, the projection 23D is placed inside a hole 11E formed in the intermediate bracket 11A and restricts rotation of the mounting bracket 23 about the bolt 23C.

The sensor 21 is fixed to the leading end of extension of the mounting bracket 23, which is closer to the front side of the seat than the fixed portion 23A is. A bolt 23E fixes the sensor 21 to the leading end. A projection 21A is a rotation stopper for the sensor 21.

The projection 21A is placed inside a hole 23F formed in the mounting bracket 23 and restricts rotation of the sensor 21 about the bolt 23E. The intermediate bracket 11A includes a restrictor 24 (see right side of FIG. 4).

The restrictor 24 is situated closer to the front side of the seat than the fixed portion 23A is and serves to restrict displacement of the mounting bracket 23 from exceeding a given extent. More specifically, the restrictor 24 is designed to contact any part of the mounting bracket 23 when the extending portion 23G (the leading end of extension of the mounting bracket 23) is displaced in excess of a predetermined extent.

As represented in two-dot dashed line in FIG. 4, the restrictor 24 thus functions as a stopper (a block) for the mounting bracket 23. As a consequence, displacement of the mounting bracket 23, and thus the sensor 21, in excess of the given extent is prevented.

3. Features of Sliding Device of Present Embodiment

The sensor 21 is situated closer to the front side of the seat than the fixed portion 23A of the mounting bracket 23. This can reduce incidents in which a toe of an occupant who is seated in the rear seat touches the sensor 21.

In an incident in which a toe of an occupant touches the sensor 21 or the mounting bracket 23, an excessive displacement of the sensor 21 can still be reduced by the restrictor 24 coming in contact with the extending portion 23G of mounting bracket 23.

In the present embodiment, the mounting bracket 23 extends from the fixed portion 23A towards the front side of the seat, and not towards the rear side of the seat. As a consequence, a large deformation of the mounting bracket 23 away from the restrictor 24 is less likely to occur; and thus a large displacement of the sensor 21 from its regular position can be reduced.

In the present embodiment, the restrictor 24 is included in the intermediate bracket 11A. This eliminates a need to arrange a dedicated member to serve as the restrictor 24. In other words, the already located intermediate bracket 11A can be used to serve as the restrictor 24.

OTHER EMBODIMENTS

For example, the sensor 21 may be an optical sensor or limit switch.

For example, a dedicated member to serve as the restrictor 24 may be located as an alternative to including the restrictor 24 in the intermediate bracket 11A.

The mounting bracket 23 does not necessarily have a "cantilever structure".

A large displacement of the sensor 21 from its regular position may be reduced by the restrictor 24 coming in contact with the sensor 21, instead of coming in contact with the mounting bracket 23.

The vehicle seat 1 may be utilized for seats used in vehicles such as railway vehicles, vessels, and aircrafts, as well as for built-in seats used in theaters and homes.

The present disclosure is not limited to the aforementioned embodiments as long as it falls within the spirit of the invention described in the claims. Accordingly, the present disclosure may be configured in combination of at least two of the above-described embodiments.

What is claimed is:

1. A sliding device for slidably supporting a vehicle seat, the sliding device comprising:
   a fixed rail that is fixable to a vehicle;
   a movable rail that is indirectly fixable to the vehicle seat and is slidable relative to the fixed rail;
   a mounting bracket including:
      a fixed portion fixed indirectly to the movable rail, and
      an extending portion extending from the fixed portion toward a front side of the movable rail,
   a sensor that is fixed to the extending portion of the mounting bracket and configured to be displaced together with the movable rail to detect a position of the movable rail; and
   a restrictor that is located closer to the front side of the movable rail than the fixed portion is,
   wherein the restrictor is spaced apart from the extending portion of the mounting bracket, and
   wherein the restrictor restricts a displacement of the sensor by coming in contact with a contact region of the extending portion of the mounting bracket when the extending portion of the mounting bracket is displaced in excess of a predefined extent toward the restrictor along a lateral axis that is perpendicular to a longitudinal axis of the fixed rail.

2. The sliding device according to claim 1, further comprising:
   an intermediate bracket for supporting the vehicle seat, wherein the intermediate bracket is fixed to the movable rail,
   wherein the mounting bracket is fixed to the intermediate bracket, and
   wherein the intermediate bracket includes the restrictor.

3. The sliding device according to claim 1,
   wherein the fixed portion of the mounting bracket is arranged at a position not overlapping with the sensor along a longitudinal axis of the movable rail.

4. The sliding device according to claim 1,
   wherein the extending portion further includes a mounting region,
   wherein the sensor is fixed to the mounting region, and
   wherein the mounting region is interposed between the restrictor and the sensor.

5. The sliding device according to claim 1,
   wherein the contact region is an end portion on a seat front side of the extending portion.

6. A sliding device for slidably supporting a vehicle seat, the sliding device comprising:
   a fixed rail that is fixable to a vehicle;
   a movable rail that is indirectly fixable to the vehicle seat and is slidable relative to the fixed rail;
   a mounting bracket including:
      a fixed portion fixed indirectly to the movable rail, and
      an extending portion extending from the fixed portion toward a front side of the movable rail,
   a sensor that is fixed to the extending portion of the mounting bracket and configured to be displaced together with the movable rail to detect a position of the movable rail; and
   a restrictor that is located closer to the front side of the movable rail than the fixed portion is,
   wherein the restrictor is spaced apart from the extending portion of the mounting bracket,
   wherein the restrictor restricts a displacement of the sensor by coming in contact with a contact region of the extending portion of the mounting bracket when the extending portion of the mounting bracket is displaced in excess of a predefined extent,
   wherein a minimum distance in a lateral direction between the restrictor and the extending portion of the mounting bracket decreases toward the front side of the movable rail, and
   wherein the lateral direction is perpendicular to a longitudinal axis of the fixed rail.

7. A sliding device for slidably supporting a vehicle seat, the sliding device comprising:

a fixed rail that is fixable to a vehicle;
a movable rail that is indirectly fixable to the vehicle seat and is slidable relative to the fixed rail;
a mounting bracket including:
  a fixed portion fixed indirectly to the movable rail, and
  an extending portion extending from the fixed portion toward a front side of the movable rail,
a sensor that is fixed to the extending portion of the mounting bracket and configured to be displaced together with the movable rail to detect a position of the movable rail; and
an intermediate bracket that includes a restrictor spaced apart from the extending portion of the mounting bracket,
wherein the restrictor is located closer to the front side of the movable rail than the fixed portion is,
wherein the restrictor restricts a displacement of the sensor by coming in contact with a contact region of the extending portion of the mounting bracket when the extending portion of the mounting bracket is displaced in excess of a predefined extent, and
wherein the intermediate bracket and the mounting bracket form an enclosed space in a plan view when the contact region of the mounting bracket comes into contact with the restrictor.

* * * * *